United States Patent
Peterson

(10) Patent No.: US 11,727,623 B2
(45) Date of Patent: *Aug. 15, 2023

(54) ASYNCHRONOUS AND CONCURRENT RAY TRACING AND RASTERIZATION RENDERING PROCESSES

(71) Applicant: Imagination Technologies Limited, Kings Langley (GB)

(72) Inventor: Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 33 days.

This patent is subject to a terminal disclaimer.

(21) Appl. No.: 17/408,276

(22) Filed: Aug. 20, 2021

(65) Prior Publication Data
US 2021/0383592 A1 Dec. 9, 2021

Related U.S. Application Data

(63) Continuation of application No. 16/905,697, filed on Jun. 18, 2020, now Pat. No. 11,127,191, which is a
(Continued)

(51) Int. Cl.
*G06T 15/00* (2011.01)
*G06T 15/06* (2011.01)
(Continued)

(52) U.S. Cl.
CPC .............. *G06T 15/06* (2013.01); *G06F 9/44* (2013.01); *G06T 11/40* (2013.01); *G06T 15/005* (2013.01); *G06T 15/80* (2013.01); *G09G 5/363* (2013.01)

(58) Field of Classification Search
CPC ....... G06T 11/40; G06T 15/005; G06T 15/06; G06T 15/80; G09G 5/363; G06F 9/44
(Continued)

(56) References Cited

U.S. PATENT DOCUMENTS 8,379,022 B2   2/2013   Tavernrath
8,411,087 B2   4/2013   Wei
(Continued)

OTHER PUBLICATIONS

Cabeleira, "Combining Rasterization and Ray Tracing Techniques to Approximate Global Illumination in Real-Time," Master's Thesis, Oct. 2010, Institute Superior Tecnico, Universidade Tecnica de Lisboa, Portugal.
(Continued)

*Primary Examiner* — Phu K Nguyen
(74) *Attorney, Agent, or Firm* — Potomac Law Group, PLLC; Vincent M DeLuca

(57) ABSTRACT

Rendering systems that can use combinations of rasterization rendering processes and ray tracing rendering processes are disclosed. In some implementations, these systems perform a rasterization pass to identify visible surfaces of pixels in an image. Some implementations may begin shading processes for visible surfaces, before the geometry is entirely processed, in which rays are emitted. Rays can be culled at various points during processing, based on determining whether the surface from which the ray was emitted is still visible. Rendering systems may implement rendering effects as disclosed.

20 Claims, 10 Drawing Sheets

Related U.S. Application Data continuation of application No. 16/052,065, filed on Aug. 1, 2018, now Pat. No. 10,719,973, which is a continuation of application No. 15/385,639, filed on Dec. 20, 2016, now Pat. No. 10,068,367, which is a continuation of application No. 14/570,314, filed on Dec. 15, 2014, now Pat. No. 9,607,426.

(60) Provisional application No. 61/919,701, filed on Dec. 20, 2013.

(51) Int. Cl.
*G06T 11/40* (2006.01)
*G06T 15/80* (2011.01)
*G06F 9/44* (2018.01)
*G09G 5/36* (2006.01)

(58) Field of Classification Search
USPC .......................................................... 345/418
See application file for complete search history.

(56) References Cited

U.S. PATENT DOCUMENTS

| | | | |
|---|---|---|---|
| 8,493,383 B1* | 7/2013 | Cook | G06T 15/06 345/589 |
| 8,593,459 B2 | 11/2013 | Mejdrich et al. | |
| 8,638,331 B1 | 1/2014 | Jarosz | |
| 8,791,945 B2 | 7/2014 | Clarberg | |
| 8,872,824 B1 | 10/2014 | Phillips | |
| 9,305,324 B2 | 4/2016 | McGuire et al. | |
| 9,483,869 B2 | 11/2016 | Munkberg et al. | |
| 9,607,426 B1* | 3/2017 | Peterson | G06T 15/005 |
| 9,773,340 B2 | 9/2017 | Balci et al. | |
| 9,934,605 B2 | 4/2018 | Nichols et al. | |
| 10,068,367 B2* | 9/2018 | Peterson | G06T 15/80 |
| 10,089,964 B2 | 10/2018 | Hasselgren | |
| 10,212,443 B2 | 2/2019 | Surti et al. | |
| 10,600,232 B2 | 3/2020 | Akenine-Moller et al. | |
| 10,719,973 B2* | 7/2020 | Peterson | G06T 11/40 |
| 11,127,191 B2* | 9/2021 | Peterson | G06T 15/06 |
| 11,443,404 B1* | 9/2022 | Kokins | G06T 15/005 |
| 2016/0071310 A1 | 3/2016 | Karras et al. | |
| 2017/0103567 A1* | 4/2017 | Peterson | G06T 15/80 |
| 2019/0156684 A1* | 5/2019 | Pohl | G01S 19/14 |
| 2019/0318454 A1 | 10/2019 | Marrs et al. | |
| 2020/0394772 A1 | 12/2020 | Afra | |
| 2021/0383592 A1* | 12/2021 | Peterson | G06T 15/005 |
| 2021/0390664 A1* | 12/2021 | Pohl | G06N 3/04 |

OTHER PUBLICATIONS

Sabino et al., "A Hybrid GPU Rasterized and Ray Traced Rendering Pipeline for Real Time Rendering of Per Pixel Effects," Entertainment Computing—ICED 2012, Springer Berlin Heidelberg, 2012, pp. 292-305.

Davidovic, T., et al., 3D rasterization: a bridge between rasterization and ray casting. In Proceedings of Graphics Interface 2012 (pp. 201-208). Canadian Information Processing Society. May 2012.

Thatcher, "Optimisations of the light culling algorithm in a Forward + Rendering Pipeline, University of Derby School of Computing & Mathematics, A project completed as part of the requirements for the BSc Computer Games Programming," 2013-2014, pp. 1-56.

Lauritzen, "Intersecting Lights with Pixels, Beyond Programmable Shading Course," ACM SIGGRAGH 2012, pp. 1-41.

Zhdan, "Tiled shading: light culling—reaching the speed of light," Game Developer Conference, Mar. 2016, pp. 1-110.

Wald et al., "Interactive Rendering with Coherent Ray Tracing," Computer Graphics Forum Sep. 2001, vol. 20, No. 3, pp. 153-165, Blackwell Publishers Ltd, Oxford UK.

Beck et al., CPU-GPU Hybrid Real Time Ray Tracing Framework, Eurographics Ass'n, vol. 0 (1981) pp. 1-8.

Aila T., "Efficient algorithms for occlusion culling and shadows;" Helsinki University of Technology; Feb. 25, 2005.

Liktor G. et al., "Decoupled deferred shading for hardware rasterization;" In Proceedings of the ACM SIGGRAPH Symposium on Interactive 3D Graphics and Games Mar. 9, 2012 (pp. 143-150).

Purcell et al., "Ray tracing on programmable graphics hardware;" In ACM SIGGRAPH 2005 Courses Jul. 31, 2005 (pp. 268-et seq).

Sik, "GPU Ray Traced Rendering and Image Fusion Based Visualization of Urban Terrain for Enhanced Situation X Awareness" (2013).

Christensen et al., "Ray tracing for the movie 'Cars';" 2006 IEEE Symposium on Interactive Ray Tracing Sep. 18 2006 (pp. 1-6). IEEE.

Hu, W., Huang, Y., Zhang, F., Yuan, G. and Li, W., 2014. Ray tracing via GPU rasterization. The Visual Computer, 30 (6-8), pp. 697-706.

Tokuyoshi Y, Ogaki S. Real-time bidirectional path tracing via rasterization. Proceedings of the ACM SIGGRAPH Symposium on Interactive 3D Graphics and Games Mar. 9, 2012 (pp. 183-190). ACM.

Woop S, Benthin C, Wald I. Watertight ray/triangle intersection. Journal of Computer Graphics Techniques (JCGT). Jun. 2013;2(1): 65-82.

Celarek, A., 2012. Merging ray tracing and rasterization in mixed reality. Vienna University of Technology. Dec. 2006.

Hillesland K, Salomon B, Lastra A, Manocha D. Fast and simple occlusion culling using hardware-based depth queries. Techinical Report TR02-039, Dept. Comp. Sci., University of North Carolina Sep. 12, 2002.

* cited by examiner

| | | |
|---|---|---|
| Pixel 1<br><br>Sample 1  Weight<br>⦿<br>Sample w  Weight<br><br>⦿<br><br>Pixel n<br><br>Sample 1  Weight<br>⦿<br>Sample w  Weight | Depth<br><br>Depth<br><br><br><br><br><br>Depth<br><br>Depth | OK to drop farther<br><br>OK to drop farther<br><br><br><br><br><br>OK to drop farther<br><br>OK to drop farther |

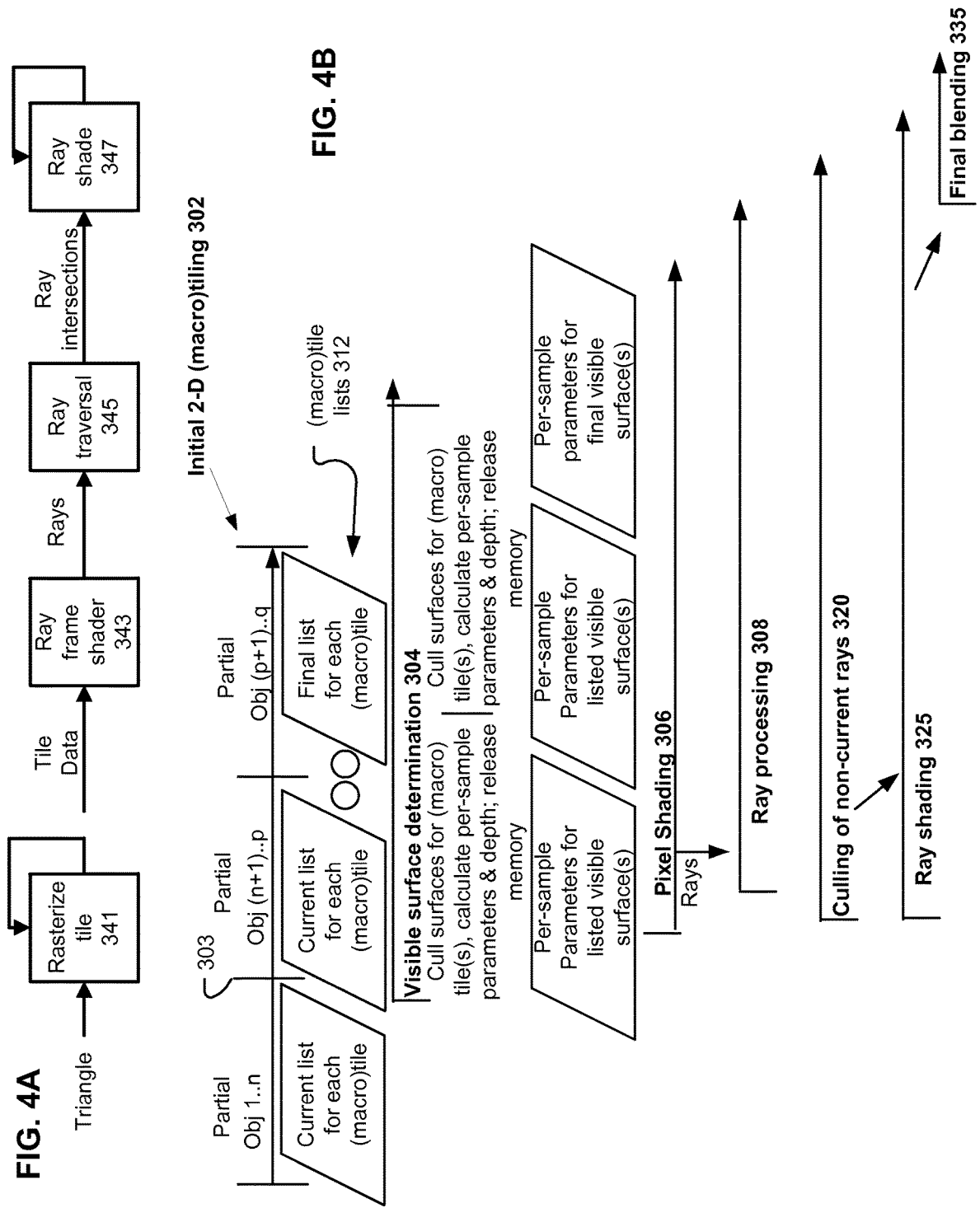

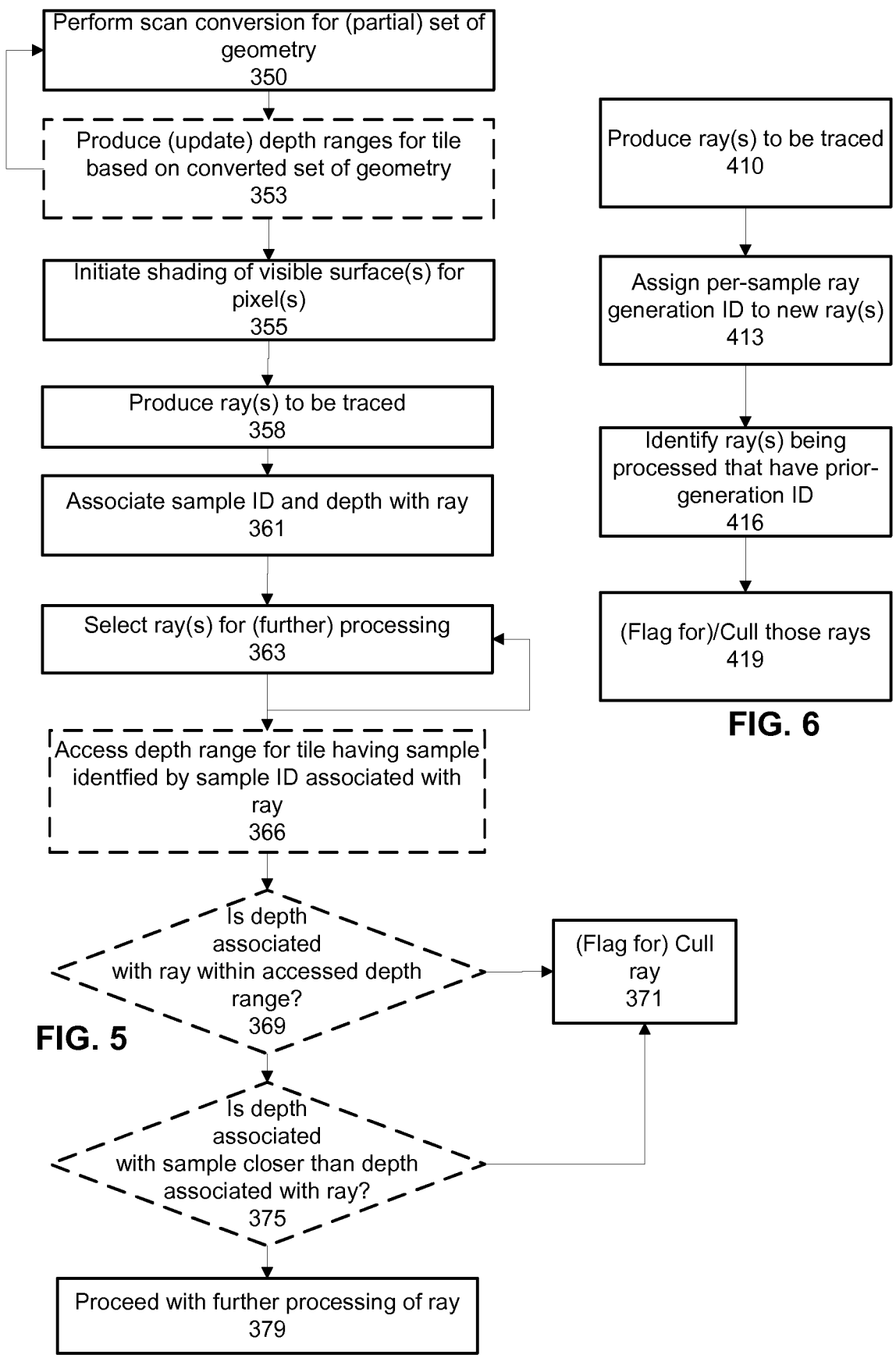

| Ray ID | Ray Def'n Data | Sample ID | Ray/surface index for Sample |
|---|---|---|---|
| Ray Ray ○ ○ Ray | | | |

FIG. 7

| Rays | Tile ID / Sample ID | Depth of visible surface for sample | ID of primitive that provides visible surface for sample |
|---|---|---|---|
| Ray Ray ○ ○ Ray | | | |

FIG. 8

| Sample ID | Current Ray/surface Generation ID |
|---|---|
| Sample Sample ○ ○ Sample | |

FIG. 9

| ray ID | Hash of Primitive ID & Sample ID |
|---|---|
| Ray Ray ○ ○ Ray | |

FIG. 10

| Primitive ID | Sample ID | Sample ID | ○ ○ | Sample ID |
|---|---|---|---|---|
| Primitive ID Primitive ID ○ ○ Primitive ID | | | | |

FIG. 11

| Primitive ID | Sample ID Range | Sample ID Range | ○ ○ | Sample ID Range |
|---|---|---|---|---|
| Primitive ID Primitive ID ○ ○ Primitive ID | | | | |

FIG. 12

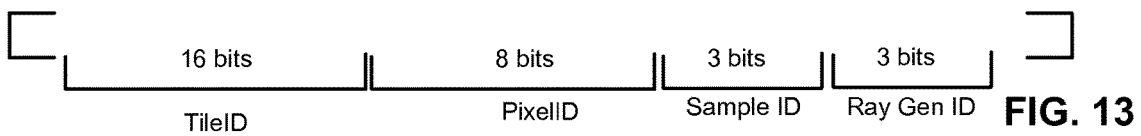

FIG. 13

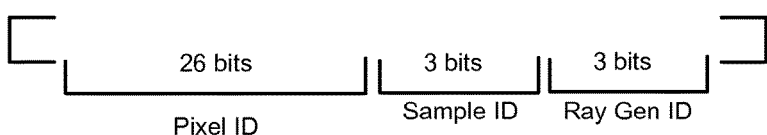

FIG. 14

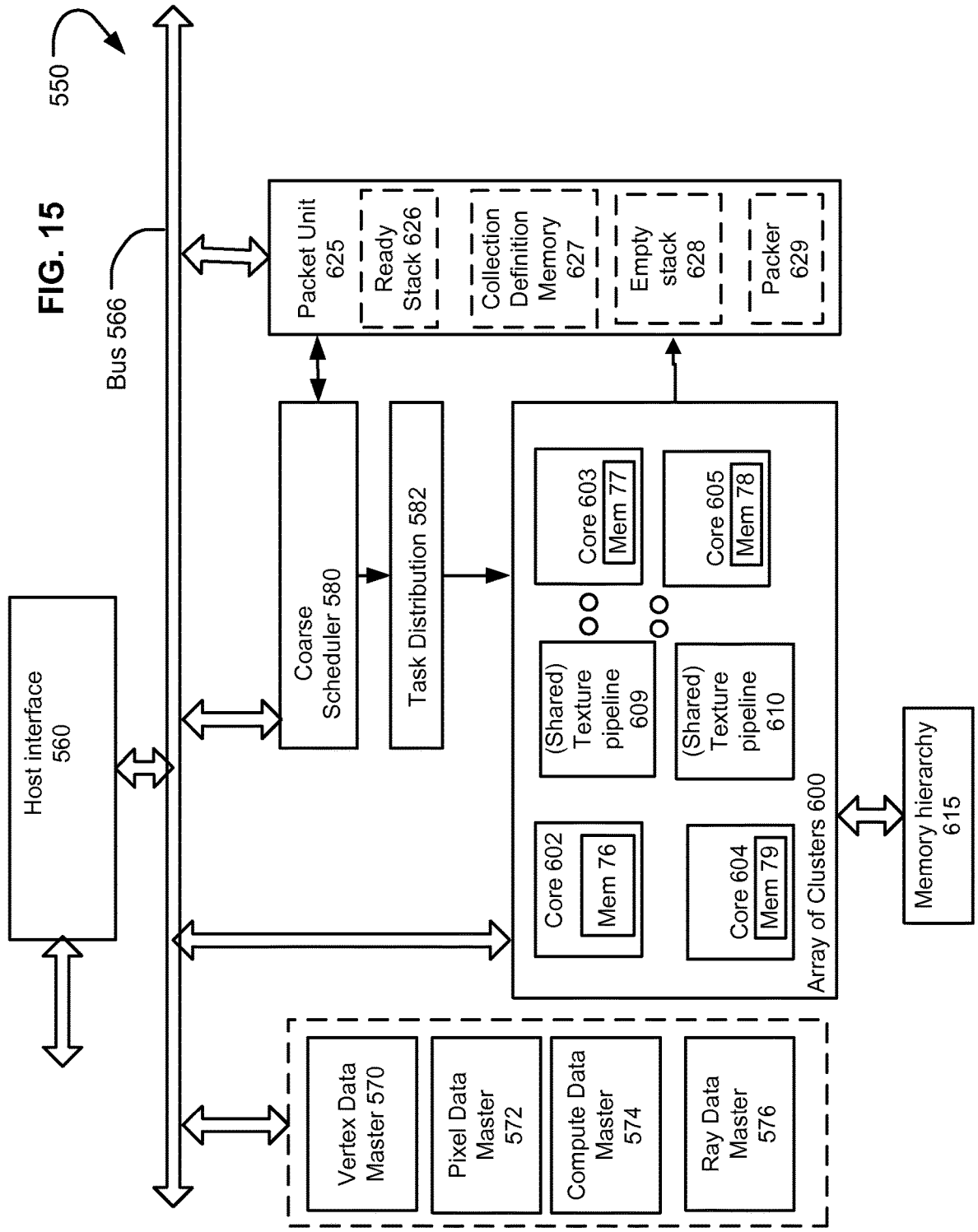

ASYNCHRONOUS AND CONCURRENT RAY TRACING AND RASTERIZATION RENDERING PROCESSES

CROSS REFERENCE TO RELATED APPLICATIONS

This application claims priority from U.S. Provisional Patent Application No. 61/919,701, filed on Dec. 20, 2013, which is incorporated by reference for all purposes herein.

BACKGROUND

Field

In one aspect, the disclosure generally relates to 3-D rendering systems, system architectures, and methods, and in a more particular aspect, the disclosure relates to systems, architectures, and methods for asynchronous and concurrent hybridized rendering, such as hybridized ray tracing and rasterization-based rendering.

Description of Related Art

Graphics Processing Units (GPUs) provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, with high performance GPUs having transistor budgets on the order of 4-6 billion transistors. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

SUMMARY

One aspect relates to a machine-implemented method of graphics processing. The method comprises beginning to rasterize a stream of geometry for a frame of pixels. A value of each pixel is defined based on one or more samples for that pixel. The rasterization comprises determining a currently-visible element of geometry at each sample for each pixel in the frame of pixels. The currently-visible element of geometry at each sample may be updated as the rasterization of the stream of geometry proceeds. Responsive to determining the currently-visible element of geometry for a particular sample, a shader is run for that currently-visible element of geometry. The running of the shader comprises emitting a ray to be traced within a 3-D scene in which elements of the geometry are located. The ray associated with the particular sample. Prior to completion of the processing of the ray, a determination is made whether a currently-visible element of geometry for the sample associated with the ray is the same element of geometry that was visible at that sample when the ray was emitted. If so, then the ray is continued to be processed. Otherwise, processing for the ray is terminated. Systems that perform an implementation of such a process may also be provided. Such systems can operate according to an immediate mode rendering approach or a deferred mode rendering approach. Deferred mode rendering approaches can implement one or more passes to determine final object visibility, where each pass involves processing only a portion of the total geometry. Various other implementations and aspects are disclosed, and this summary is not limiting as to processes or apparatuses that implement any aspect of the disclosure.

Implementations can function using immediate mode geometry submission, can tile geometry and handle hidden surface removal tile-by-tile, can defer shading, can perform hidden surface removal on tiles and defer rendering. Implementations can perform partial renders of an entire geometry submission, and perform ray culling between such geometry submissions, for example.

BRIEF DESCRIPTION OF THE DRAWINGS

For a fuller understanding of aspects and examples disclosed herein, reference is made to the accompanying drawings in the following description.

FIGS. 4A and 4B depict aspects of an example deferred mode rendering pipeline implementation of the disclosure;

FIG. 5 depicts an example method according to the disclosure, in which depth or depth ranges are used for ray culling;

FIG. 6 depicts an example method according to the disclosure, in which per-sample ray generation identifications are used for ray culling;

FIGS. 7-12 depict examples of various data structures that can be used in tracking data for use in ray culling in implementations according to the disclosure;

FIGS. 13 and 14 depict examples of ray generation identification information that can be used for ray culling in implementations according to the disclosure; and FIGS. 15 and 16 depict example computation systems or apparatuses in which aspects of the disclosure can be implemented, and in which functional modules of FIGS. 1 and 2 can be provided.

DETAILED DESCRIPTION

The following description is presented to enable a person of ordinary skill in the art to make and use various aspects of the inventions. Descriptions of specific techniques, implementations and applications are provided only as examples.

Various modifications to the examples described herein may be apparent to those skilled in the art, and the general principles defined herein may be applied to other examples and applications without departing from the scope of the invention. Although systems and methods of rasterization have developed and been implemented largely separate from systems and methods of ray tracing, there have been some efforts to combine the two. For example, it has been proposed to use a first pass of rasterization to determine object visibility and then to use a subsequent ray tracing pass to determine whether those visible surfaces are directly occluded by geometry from being illuminated by lights that emanate light into the 3-D scene.

In one aspect of the disclosure, ray tracing tasks proceed concurrently with rasterization tasks. Techniques to avoid performing ray tracing tasks that can be determined not to contribute to a final rendering product are disclosed.

Figure 1A:
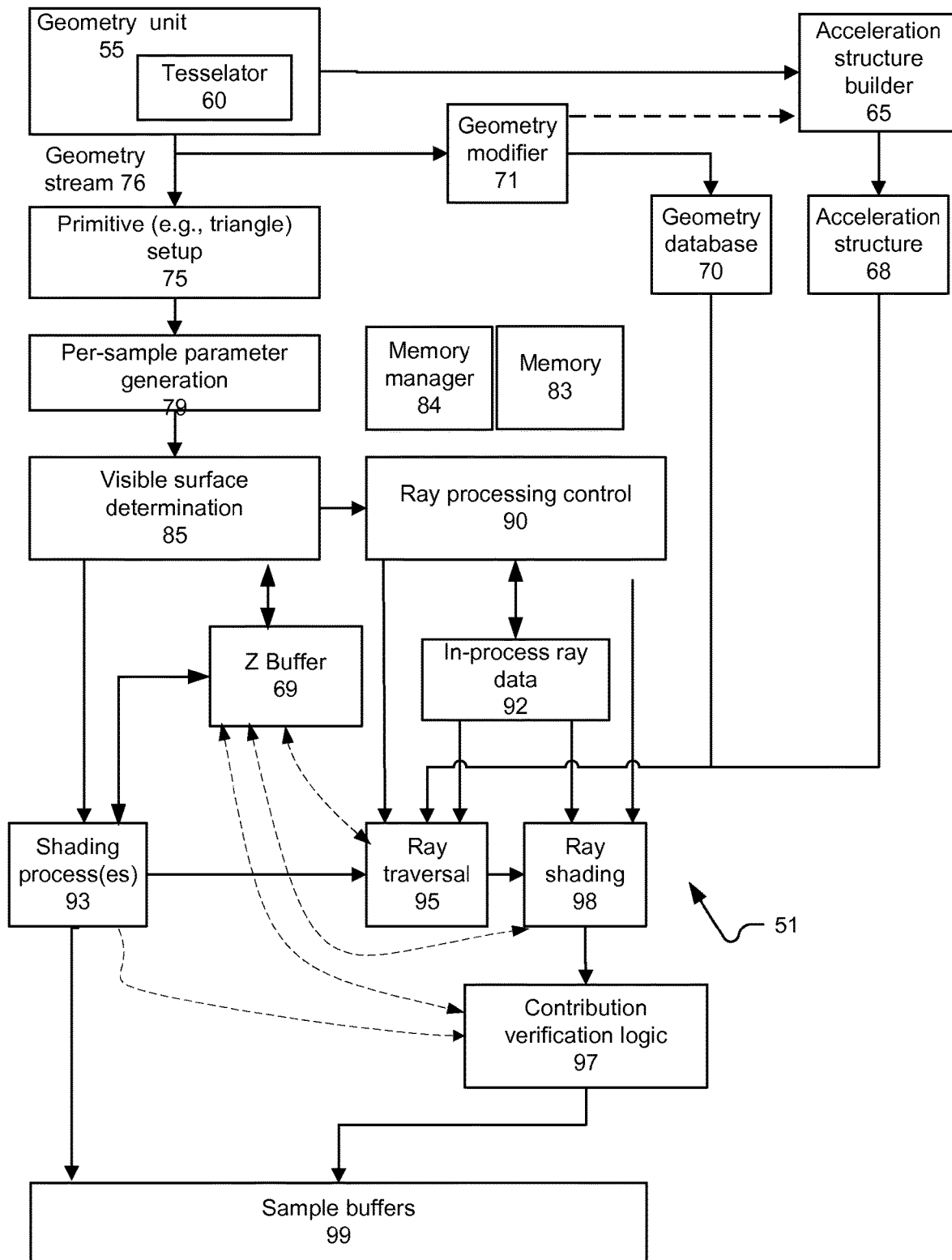
FIGS. 1A and 1B depict aspects of an example functional module arrangement of a system or apparatus in which aspects of the disclosure can be implemented according to an immediate mode rendering approach.

FIG. 1A depicts a block diagram of an example system 51 in which hybrid ray tracing and rasterization aspects disclosed herein can be implemented. In particular, system 51 is generally consistent with an immediate mode rasterization approach. System 51 includes a geometry unit 55 that can include a tesselator 60. Geometry unit 55 produces a stream of geometry 76. Geometry stream 76 is inputted to a primitive setup process 75; for example, triangles may be a type of primitive that is processed. Process 75 may be implemented in a programmable processor module, fixed function circuitry, or a combination thereof. Geometry from stream 76 also is stored in geometry database 70. In some implementations, geometry stream 76 is modified by a geometry modifier 71, which can modify the geometry prior to storage in geometry database 70. For example, geometry modifier 71 may reduce a number of primitives that represent a given shape. Geometry unit 55 also may store geometry directly in geometry database.

Geometry unit 55 may also output geometry stream 76 for a 3-D scene to an acceleration structure builder 65. Geometry output to acceleration structure builder 65 may be simplified, or otherwise have a reduce triangle count, compared with a set of source geometry, with tessellated geometry, or with geometry modified according to a modification procedure. Geometry provided to acceleration structure builder 65 also may be provided from geometry modifier 71.

Primitive setup 75 operates to define a relationship of a given primitive to a perspective from which a 2-D image will be rendered. For example, line equations for a triangular primitive may be setup. A parameter generation module 79 is configured to generate per-sample parameters for the primitive. In some implementations, samples correspond to pixels of a 2-D image to be rendered; in other situations, samples may be multisampled for pixels, may be randomly or pseudorandomly selected, and so on. The per-sample parameters may include parameters such as depth of the primitive for the sample, and interpolated values for parameters associated with vertices forming the primitive.

A visible surface determination module 85 uses at least some of the per-sample parameters, and data compiled for each sample to determine whether (or for which), if any, samples the primitive being processed provides a visible surface. Primitive setup 75 may involve setting a primitive up to be scanned for overlap with a set of samples of a frame of pixels (where each pixel may be formed from data taken from one or more samples). Since FIG. 1 primarily relates to an example implementation of the disclosure when triangles from the stream are immediate scan converted, rasterized and shaded (rather than deferring shading), FIG. 1 may have various portions parallelized, such as a separate processes 75 and 85 for each primitive in flight.

Visible surface determination module 85 interfaces with a Z buffer 69, which stores one or more depths of surfaces. The depth information stored in Z buffer 69 may depend on how geometry is submitted. For example, if geometry is submitted in a known order, and opaque geometry is segregated from translucent geometry, then a depth of a closest opaque surface can be maintained. If translucency of geometry cannot be determined before shader execution, and geometry is not guaranteed to be sorted, then geometry may not be able to be culled using a visible surface determination 85 and Z buffer 69 that operates on per-sample depth calculations, such as by interpolating vertex parameters for a given primitive. In immediate mode rendering, it is commonly required to have geometry sorted before submission for rasterization, and also to segregate opaque from translucent geometry, so the above consideration may be addressed by convention.

Data concerning visible surfaces, as determined by visible surface determination module 85, can be provided for shading, with shading process(es) 93. A separate shading process may be invoked per pixel, per surface, or per sample, for example. Shader code executed for each shading process may be associated with the source geometry. A ray processing control 90 also may receive data concerning visible surfaces, as determined by visible surface determination module 85. Visible surface determination module 85 can implement immediate mode rendering, in which each primitive is processed as it becomes available, and in contrast to deferred mode rendering; tiling can be implemented of geometry can be implemented in immediate and deferred rendering modes. A memory manager 84 can manage and allocate portions of a memory 83. Some implementations of the disclosure also may implement deferred rendering, such as a tile-based deferred rendering approach. In some implementations or operating modes, samples may be taken one per pixel. In other implementations or operating modes, multiple samples may be taken for each pixel. Samples may correspond to particular areas within a 2-D grid of pixels being rendered; however, in some situations, samples also may correspond to a surface in a 3-D scene, or to an arbitrary point. As such, the usage of "sample" in this disclosure is generic to these options, and does not imply any requirement that rays be associated only with screen pixels or parts of such.

Ray processing control 90 maintains in-process ray data 92. Ray processing control also controls ray traversal module 95 and ray shading module 98. These modules may be implemented as one or more processes running on programmable hardware, on fixed function hardware or a combination thereof. A geometry database 70 and an acceleration structure database 68 may provide inputs to ray traversal 95 and ray shading 98 modules. A sample buffer 99 provides storage for outputs of shading process(es) 93 and ray shading modules 98. Sample buffer 99 may provide separate locations to store multiple values resulting from each ray shading processing and at least one rasterization process that affects a given pixel. Sample buffer 99 may be implemented for one or more tiles or subsets of an entire rendering. Sample buffer 99 may be used to update or otherwise be later-synchronized with a full buffer, for example.

FIG. 1A depicts that ray traversal module 95 and ray shading module 98 can access Z buffer 69. Each of ray traversal module 95 and ray shading module 98 may represent a plurality of independently executing threads executing on programmable processor core(s), fixed function logic, and/or combinations of these. Accessing Z buffer 69 may involve accessing a specific location in Z buffer 69 for a sample associated with a ray that is taken up for processing (e.g., traversal through an acceleration structure or a portion thereof, or shading). Each of ray traversal module 95 and ray shading module 98 may access Z buffer 69 in order to determine whether a given ray should be further processed or not. For example, more computation and data access is avoided if a ray can be culled close to a start of traversing an acceleration structure rather than closer to completing such traversal. Ray shaders also may vary in computation cost and amounts of data to be accessed. Such costs can be hinted by shader code and used by a ray shader setup process to indicate how aggressively a given ray shader should be culled.

Such check may be conducted or not, depending on a cost of performing the operation, the amount of computation or data access that may be saved versus costs incurred to perform the check. In some cases, data in Z buffer 69 may include ranges of depths for a set of pixels, or a hierarchy of ranges for differently sized groupings of pixels. These depth ranges may serve in one or more preliminary stages of culling of rays, so that fewer memory accesses will be required of a larger memory. In an example, such depth ranges can be cached in a small private cache that is accessed by ray processing control 90, or by ray traversal 95 and ray shading 98 modules. Where tiling is used, depth ranges may be maintained for a tile or a group of tiles, for example. Ranges can be maintained when new information is available, such as based on output of a calculation unit such as by per-sample parameter generation 79.

Contribution verification logic 97 receives outputs of ray shading 98 and also can access Z buffer 69. Contribution verification logic 97 determines whether geometry has completed processing, that a given ray shading result is valid and thus can be written to a sample buffer. Contribution verification logic 97 may perform this check by determining whether a depth or other identifying information for a combination of ray and sample (see below) indicates that such ray may still contribute to a non-occluded surface. In some implementations, processing of geometry may need to entirely complete, such that a final visible surface for a given sample is finally determined, before it can be determined whether any result from ray shading may be stored. In some implementations, sample data for completed ray shaders may be stored, and then committed after it is determined that the result is valid. Such logic 97 also may determine that a given ray shading result is invalid, even though a valid result for a given sample is not yet known. Such logic 97 may operate to provide a correct rendering solution, in that logic 97 should be designed to avoid having a result of shading a ray for a now-obscured surface used to produce a rendering result. By contrast, ray traversal 95 and ray shading 98 operate to opportunistically avoid computation or data access, but do not necessarily need to identify each opportunity to cull a ray or other computation process relating thereto. In some implementations, logic 97 would be arranged so that false culling is avoided, at the expense of potentially performing unnecessary shading.

Figure 1B:
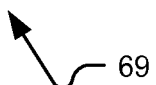

It should be understood that system/apparatus 51 can be configured to operate in a variety of ways. For example, ray processing control 90 can be configured to generate ray culling signals directed to ray traversal 95 and ray shading 98, and can generate these signals based on data received from visible surface determination module 85, or by accessing relevant data from Z buffer 69. FIG. 1B depicts an example Z buffer 69. In FIG. 1B, each pixel of a plurality of pixels is associated with one or more samples. Each sample may have an associated depth to a surface found to be visible for that sample; such depth may be initialized and updated as visible surfaces are found. Z buffer 69 also may include an indication whether it is acceptable to drop rays that are associated with farther surfaces. This aspect can be influenced by a depth compare mode in effect. Some implementations of the disclosure will identify a single closest visible surface, regardless whether surfaces are opaque or translucent, for a set of geometry. Then, effects associated with translucency of geometry will be handled through ray tracing. Thus, in such implementations, at a time of geometry sorting, whether or not a given surface is opaque or not may be disregarded. However, other implementations may involve rasterization shaders contributing color for opaque surfaces that are visible through translucent surfaces. Then, even though the opaque surface is farther, it would not be appropriate to drop rays emitted for shading that surface.

As another example, a signal can be provided, such as from visible surface determination module 85, which indicates when an updated depth is available for a given sample. Then, ray processing control 90 can identify which rays, identified by in-process ray data 92, can be culled based on that update, if any.

Figure 2A:
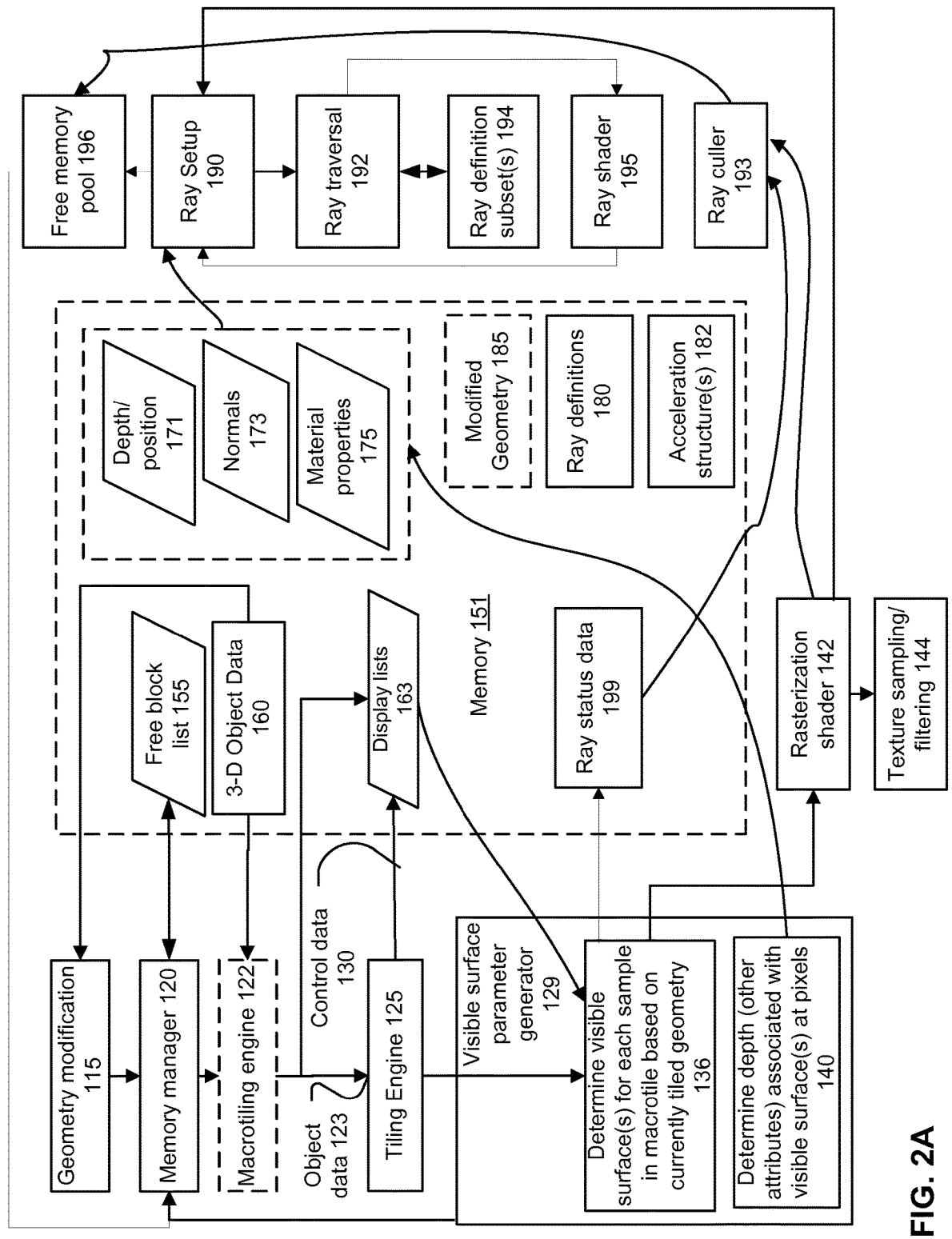
FIGS. 2A and 2B depict aspects of an example functional module arrangement of a system or apparatus for rendering that implements deferred mode rendering, in which aspects of the disclosure can be implemented according to a deferred shading rendering approach.
Figure 2B:
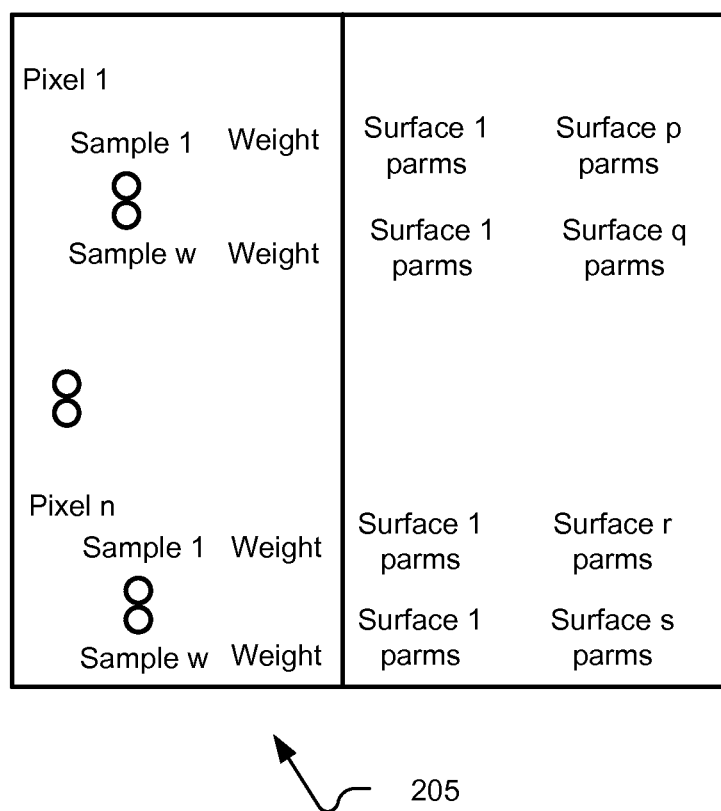

FIG. 2 depicts an example system that implements a deferred rendering implementation of aspects of the disclosure. A geometry modification unit 115 communicates with a memory manager 120. Memory manager 120 has access to a free block list 155, which defines a set of locations in a memory available to receive tiling data, which comprises data indicating which primitives overlap which portions of a 2-D screen space. This is an operation that considers overlap of primitives transformed from a world space coordinate system into a screen space and depth representation. A macrotiling engine 122 may be provided to perform an initial coarse mapping of primitives to a set of coarse-grid screen space subdivisions (for the sake of convenience, "macrotiles"). At this stage, only 2-D overlap may be determined, and visibility determinations are postponed. Object data 123 also may be provided to tiling engine 125. Tiling engine 125 performs a mapping of primitives to a finer scale subdivision of the 2-D pixel grid (called "tiles" for convenience). For example, each macrotile may have 4, 8, 12, 16 or 32 tiles, and each tile may be a square or a rectangle of a pre-determined number of pixels. Some implementations may provide that tiles are always a fixed size. Macrotiles may be fixed-size or variable-sized. Macrotiling engine 122 may not be included in all implementations, in that not all implementations may divide a 2-D set of pixels into macrotiles (i.e., some kind of hierarchical grouping of tiles).

Tiling engine 125 may generate control data 130 that is stored in a set of display lists 163. Each display list contains data from which can be determined a set of primitives that need to be considered in order to identify a visible surface for each sample (e.g., pixel) within a tile corresponding to that display list. In some cases, data can be shared among display lists. For example, each macrotile may have a display list, and hierarchical arrangements of data may be provided to indicate which primitives within the macrotile need to be considered for a given tile, and likewise for each pixel within a given tile. FIG. 2A depicts an example of a tile-based deferred rendering system that may be implemented according to any of these examples.

A visible surface parameter generator 129 operates to identify visible surfaces for samples and to produce parameters for those visible surfaces at each sample. In one example, generator 129 begins operation after a stream of geometry has been completely processed, such that all primitives have been mapped to appropriate display list(s). Some implementations may support multiple partial render passes, in which some of the geometry is processed in each pass. Generator 129 may process these display lists on a macrotile by macrotile basis. When memory blocks used for a display list being processed are done, these can be signaled as freed, for reuse by memory manager 120. Where multiple partial rendering passes are implemented, secondary rays may be emitted by during shading of a given surface that is a candidate visible surface; these rays would need to be traced within a complete scene database, such as database 70 of FIG. 1A or modified geometry 185 of FIG. 2A.

Generator 129 may comprise circuitry or a functional element 136 for determining a visible surface for each sample; element 136 may access display lists 163. Generator 129 also may include circuitry or a functional element 140 for determining attributes of the surface at each sample (attributes can include depth only, or depth and other values). In one example, these elements 136 and 140 may be implemented so that per-sample attributes, including depth, are calculated, and then that depth may be used in a comparison with a current depth or depths being tracked for that sample. Interpolation is a term that most directly connotes planar primitives, such that a depth for a primitive at a particular sample can be derived from depth of vertices defining the planar primitive. However, the term interpolation as used here covers other approaches to deriving per-sample depth for other geometry definition approaches. Examples of other parameters that may be interpolated include normals and material properties. These parameters can be stored in memory 151 or made to propagate through a pipeline.

During processing of opaque primitives, a primitive with a depth closer to a viewpoint becomes a new current candidate for the visible surface at that sample. Some implementations may segregate opaque from translucent primitives, such that translucent primitives are provided together in a separate pass from opaque primitives. In some cases, when a new surface is identified as being the current closest (and potentially visible) surface at a sample, the parameter values for the prior closest surface may be overwritten, or may be retained. They may be retained for a period of time, such as in a cache. Possible usages of this information is addressed below. These are examples of implementation details and examples of how systems according to the disclosure may behave.

In addition to storing 3-D object data 160, free block list 155, display lists 163, and parameter data, such as depth 171, normal 173 and materials properties 175, memory 151 also may store modified geometry 185, ray definitions 180 and an acceleration structure 182. These data may be used for processing rays. Rays to be processed may be setup by a ray setup module 190, traversed by a ray traversal module 192 (ray traversal here including the operations that are performed by a particular implementation to identify an intersection (such as the closest intersection) for rays being processed or to determine no intersection or to return a default value absent an intersection with geometry, for example.

By contrast with the example system of FIG. 1A, the system of FIG. 2A defers shading of surfaces until a final visible surface for a given sample has been identified. Then, a rasterization shader 142 can execute a set of shading instructions for that visible surface. Rasterization shader 142 may use texture sampling and filtering unit 144 in order to obtain texture data for texturing each sample. Rasterization shader 142 may output rays that are to be traversed and potentially shaded. These rays can be setup by ray setup module 190, and traversed using ray traversal unit 192. Ray traversal unit 192 may operate on a subset of rays that are currently defined and needing to be processed in order to complete the rendering of the frame. When an intersection for a ray has been identified that requires shading, then ray shading module 195 may execute a module of instructions to accomplish such shading. Implementations may implement rasterization shader 142 and ray shader 195 within the same set of programmable hardware units, using space and/or time division multiplexed computation, multi-threading, and other computation techniques. The term module, in the context of shading code, identifies a portion of shader code that is to be used, but does not imply a specific software organization.

Figure 3:
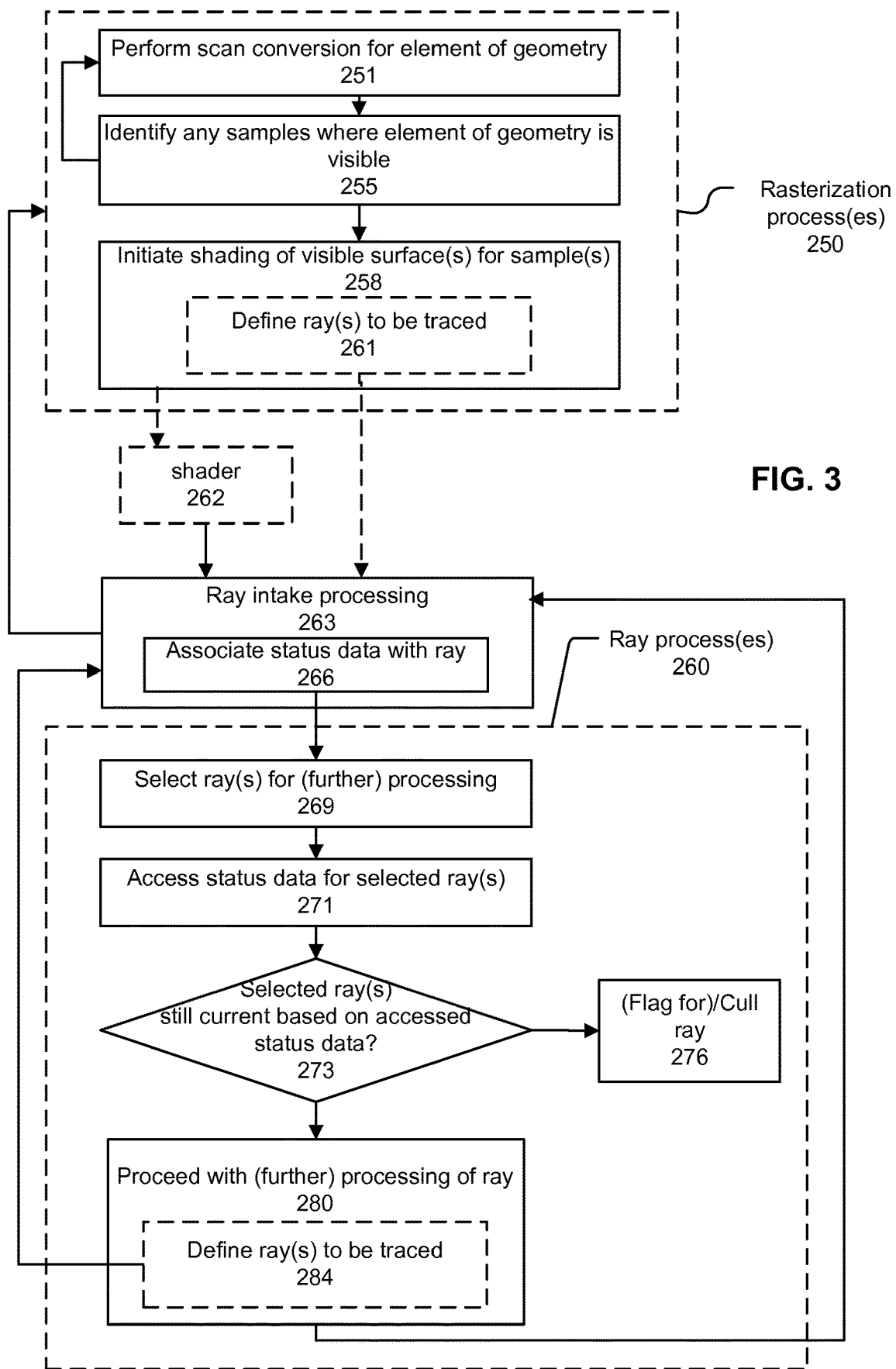
FIG. 3 depicts aspects of an example method according to the disclosure.

Within the context of these example systems, FIG. 3 depicts an example flow of actions that can be undertaken by a system according to these examples. Within a rasterization process 250, scan conversion is performed (251) for an element of geometry (e.g., a primitive, such as a triangle). Here, scan conversion refers to identification of samples covered by a particular primitive and derivation of per sample parameters (at least depth) for that particular primitive.

Samples where this element of geometry is currently visible are identified (255) and shading of the visible surface(s) for these samples is initiated (258). Shading of visible surfaces may also involve defining color values that will be contributed to a sample buffer, which can be combined with other prior values, or stored separately, and used in a subsequent blending operation, for example. These operations can be performed by instructions executing on a programmable unit.

Such shading may result in ray(s) being defined (261) for tracing. In another implementation, each pixel overlapped by the element of geometry may be shaded, even though not all pixels overlapped may have the element of geometry as a visible surface. Actions 251, 255 and 258 may be performed on a stream of geometry; an example of a stream of geometry is a sequence of geometry elements as defined by sets of definition data provided over a period of time. Elements of geometry also may be considered as groupings of individual primitives, where "primitive" is used to define an elemental representation, such as a point, line, or planar shape, such as a triangle. As such, using an example of triangular primitives does not exclude other ways to represent geometry. Formats for defining geometry elements may vary among implementations, and any suitable approach may be used here (e.g. triangle strips, fans, higher order surfaces, and so on). After performing identification (255) for a given element of geometry, Rays defined during shading are provided for ray intake processing (263).

In one implementation, ray intake processing (263) includes providing an identifier for the ray (a rayID), and storing definition data for the ray, in association with the rayID, so that the rayID can be used to identify definition data for the ray. In addition, status data is associated (266) with the ray. Such status data can take a variety of forms, depending on implementation. Such status data provides, in an implementation of the disclosure, a way to determine whether a given ray is associated with an element of geometry that no longer contributes to a rendering. Various examples of such status data and how that status data is used to make such determination are explained below.

FIG. 3 depicts another implementation possibility for defining rays to be traced. When a surface for a given sample is to begin a ray tracing operation, a shader 262 can be called with input parameters for that surface. For example, coordinates for a hit point can be supplied to a shader module associated with a surface that was found to be visible for the sample being processed. Shader 262 then emits one or more rays to be processed. In such example, rays are not defined by shader code associated directly with the surface being shaded as a result of rasterization, but rather rasterization causes appropriate inputs to be provided to a ray shader module that causes emission of rays using those inputs. Those rays can then be traced.

Rays defined are then provided for processing. In one example, rays are selected (269) for processing and then status data for these selected rays is accessed (271). A determination (273) whether the selected rays are still current is made. If any ray(s) is no longer current, then that ray or rays is culled (or flagged for culling) (276). For any ray that is still current, processing can proceed (280) for that ray. Such processing may include further traversal through an acceleration structure, testing the ray for intersection with a primitive, or shading of the ray for an identified intersection, for example. Such processing (280) also may result in rays being defined (284) that require processing. Definition data for such rays can be returned to ray intaking processing (263). A variety of approaches can be implemented for selecting (269) rays for (further) processing. For example, rays can be selected according to a Single Instruction Multiple Data (SIMD) computation model. Such selection may involve tracking program counters for a pool of traversal or primitive intersection testing routines and selecting a subset of these routines that require the same processing for one or more cycles. For example, packets of rays that are to be tested for intersection with the same acceleration structure element or primitive can be formed and scheduled for execution. A variety of other computation models may be employed in different implementations. Therefore, it should be understood that the example sequence of selecting rays for processing, or for further processing, and then determining whether those selected rays are still current is an example, but such selection and determination of currency may be implemented differently in different implementations. For example, both of these actions may be performed concurrently, and a conjunction of both respective subsets of remaining rays from each action can be made.

FIG. 4A depicts a rendering pipeline in which visible surfaces for samples within a tile are determined for one or more sets of geometry, before shading of those visible surfaces is begun. A triangle (as a more general example of a primitive, which is an example of a surface) is submitted to a rasterization unit 341. This submission can occur a number of times for a given set of geometry. Within rasterization unit 341, a variety of processes occur to produce a dataset for a tile of samples (e.g., pixels or parts of pixels). Such dataset would include information for a visible surface at each sample, such information can include depth, an identifier for such surface, and interpolated parameters that were associated with vertices defining the surface. In some implementations, an entire set of geometry may be submitted and processed in different subsets. In one implementation, each partial render remains within the rasterization unit 341 until a final visible surface for each sample in the tile is found, which may involve multiple partial renders. In another example, treated in FIG. 4, ray processing may begin after each partial render, such that later submitted geometry may occlude a surface visible for a sample in an earlier partial render, thereby causing rays emitted for shading that now-occluded surface to be not-current. A variety of approaches can be implemented for geometry submission and tiling, and FIG. 4A is simply a representation of such implementations. After data for a tile is produced, such data can be submitted to a ray frame shader 343 which can emit a set of rays for the samples within that tile. These rays can be traversed within a ray traversal portion 345 and then shaded in a ray shading portion 347 of the depicted pipeline. Ray traversal and ray shading portions 345 and 347 can be implemented in a variety of ways. In some implementations, portions of ray traversal may be implemented in fixed function or limited configurability circuits, while ray shading may be implemented in programmable processor(s).

FIG. 4B depicts a processing flow, in which a series of partial renders with subsets of geometry are performed. Partial renders may be performed in circumstances in which a given scene has an amount of geometry that is too large to be tiled within an available memory for such tiling. Memory availability can include concepts such as confining processing to within an on-chip storage, even while more memory is available off-chip, for example. Also, although FIG. 4B depicts multiple partial renders, a person of ordinary skill would be able to understand, from the disclosure, how a single render, in which all geometry is processed in one tiling operation, would be performed.

At 302, there is initial 2-D (macro)tiling. This initial tiling involves producing current lists for each tile or for each macrotile. In this example, a sequence of partial renders occurs, which would happen for scenes of relatively high complexity and/or for implementations that have relatively restricted amounts of memory for storing (macro)tile lists 312 created for the geometry processed thus far. Thus, (macro)tiling 302 performs an initial sorting of some portion of geometry into macrotiles or tiles. Some implementations may sort such geometry into a hierarchy. Thus, FIG. 4B is illustrative of a variety of implementations of initial (macro) tile binning of geometry, resulting in data (called a display list here), that is used for determining a visible surface. Such display lists can be formatted in a variety of different ways, in order to reduce an amount of space required to store such data. Data 303 identifies one division between partial renders; where an entirety of geometry is processed, 303 represents a result of binning all scene geometry. When a partial render begins, one or more of the current (macro)tile lists are processed in order to free memory for processing more geometry.

Thus, visible surface determination 304 begins for the display list(s) selected for rendering, resulting in culling of non-visible surfaces, calculation of per-sample parameters, maintenance of per-sample parameters for the currently visible surface at each pixel and release of memory used for those display list(s). This sequence of actions may repeat a number of times. Although some implementations may delay pixel shading until after geometry has been fully processed, so that a final visible surface for each sample can be determined, this example provides that pixel shading begins on candidate closest surfaces, before a respective final visible surface for each sample is determined. Pixel shading 306 produces rays that need to be processed 308. In some examples, separate shaders may be called for ray emission.

During such processing, additional rays may be emitted. As depicted, pixel shading 306 and ray processing 308 overlap in time. Also overlapping with these ongoing actions is culling of non-current rays 320 and ray shading 325. Culling 320 is explained in more detail below. Final blending 335 may commence for some pixels after all rays have completed processing for those pixels. Thus, FIGS. 4A and 4B shows an example where pixel shading and ray emission and subsequent processing for a series of partial renders can be implemented. This approach may in some cases result in excess computation, since some rays may end up being partially processed but the surfaces from which they were emitted may be obscured. However, an overall latency of producing a frame can be reduced where resources are available to conduct such ray processing concurrently with rasterization processes.

FIG. 5 shows an example in which depth can be used to cull rays that are non-current. In the example of FIG. 5, scan conversion is performed (350) for a set of geometry. From the scan converted geometry, depth ranges for tiles are optionally produced (353) from the depths produced during scan conversion. Shading of currently visible surfaces can be initiated (355). This produces (358) rays to be traced. These rays are associated (361) with a sample ID and a depth to the currently visible surface for the identified sample. Rays are selected (363) for (further) processing. A sample ID corresponding to each selected ray is identified and a depth range for the tile(s) containing those sample IDs is accessed (366). If the depth of a ray is outside of the current depth range of the tile, then that ray can be culled (or flagged) for culling (371).

If a ray passes the range check (369), then a comparison between the depth associated with the ray and a current depth associated with the sample associated with the ray can be performed (375), and if that comparison fails, the ray can be culled (371). Otherwise processing can proceed (379) for the ray. These depth comparisons can also incorporate a depth compare mode that is setup within a rendering pipeline for the subset of geometry being processed.

This approach to culling may be appropriate, for example, where a group of rays can be identified that all may contribute to a sample within the same tile (or macrotile). Then, a single depth range for that tile can be compared with the depth of each ray. Such technique may be most appropriate for situations where depth is smoothly varying among samples, or where only a few surfaces are visible within a tile. Depth ranges can be produced at different levels of granularity. An amount of computation to produce and maintain such depth ranges is a tradeoff with an amount of ray processing that can be avoided by culling rays, and by reducing an amount of memory accesses required to lookup depth ranges. Some implementations are tile-based deferred renderers and may produce depth ranges as a byproduct of hidden surface removal operations. These depth ranges can be made available for use in ray culling. This disclosure presents examples of tracking rays in batches for culling opportunities based on depth comparisons. Such a depth-oriented technique may be combined with other conditions and techniques disclosed herein, as explained below.

FIG. 6 shows another example process that can be implemented. In FIG. 6, rays are produced (410) for tracing, such as according to approaches described above. Each ray is assigned (413) a per-sample generation ID. A per-sample generation ID is a sequential identifier that is specific to each sample. When a new primary ray set is emitted that may contribute to a particular sample, the generation ID is incremented. Note that the generation ID would not be incremented for secondary rays emitted as a result of processing a given primary ray, since those secondary rays would contribute through the ray path of their primary ray. Also, primary rays that were all emitted as a result of shading the same surface generally would be given the same generation ID (for simplicity). An interface between an executing shader and a ray intake processing function can be made to accommodate passing of data that can be used to determine whether the generation ID should be incremented or not. One benefit of using a generation ID is that a number of bits required to maintain such an identifier would be expected to be less than associating a per-primitive identifier with each ray (that uniquely identifies a surface). Then, FIG. 6 shows that rays can be identified (416) that are associated with a prior-generation ID and those rays are (flagged for) culling 419. As with the prior examples, ray shading can itself generate rays to be traced and as explained these also would be associated with a sample ID and generation ID that is derived from their parent ray. Note that rather than repeating this data, these secondary rays also can simply refer back to these identifiers for their respective parent ray. The usage of ray generation identifiers can be combined with usage of depth range checks as disclosed above, by way of example.

FIG. 7 depicts associating ray identifiers with ray definition data, and a sample identifier to which the ray may contribute. Such sample identifier can be a location in a frame buffer where the ray may contribute, or an index of a pixel or fragment subdivision of a pixel, for example. FIG. 7 also depicts that each ray identifier may be associated with an index value for the identified sample, when an original ray associated with the identified ray was emitted. Here, identified rays may be child rays from a given parent ray. That parent ray in turn would have been emitted from a surface that was originally relevant to the identified sample, within a rendering being produced. Thus, an incrementing index value for each parent ray that is emitted from a given sample ID can be provided. Each child ray emitted from that parent ray can inherit this index. When a ray is emitted from a surface determined to be visible at a certain sample, then a current index associated with that sample can be incremented. A respective index associated with a given ray can be compared with a current index of the sample to which that ray may contribute. If the indexes do not match, then the ray can be considered to not be current.

In a multisampling situation, where multiple rays are emitted from the same surface, all such rays can share the same index value. Another approach to such indexing can be to provide a distance to the visible surface from which a given parent ray was emitted, and each surface index propagates or references such distance value from a parent ray. When a visible surface distance for a given sample changes, all rays associated with that sample which have a greater distance can be culled.

These index values also can be coded or otherwise associated with data indicating whether a surface from which a parent ray was emitted is translucent or opaque and culling of rays can be determined using translucency/opaque information. In particular, if a closer surface is translucent, then even though there are rays associated with a surface that is more distant, these rays may be maintained, as they may still contribute to the sample. The above example is in contrast to a situation where only the closest surface is shaded for ray tracing. In that situation, the translucent surface is treated as being opaque and transparency effects (refraction and transmission) are handled by emission of appropriate rays from that closest surface, and the opaque, more distant surface is not shaded.

In some implementations, geometry may be ordered, such that all opaque geometry is submitted for rendering during rasterization before translucent geometry. In such implementations, there may be an identifiable transition between when a rasterization element is rasterizing opaque geometry and translucent geometry; in some implementations, a flag may be associated with each geometry element that is transparent. If only a closest surface will be shaded (ray emission), then these flags may be ignored, and all geometry treated as though it were opaque for the sake of hidden surface removal. If multiple surfaces are to be shaded (not just a closest surface) closer geometry for a given sample may no longer be useful in culling rays that remain to be completed, because the rays for a prior surface may need to be maintained anyway. As such, implementations of the disclosed culling can stop checking rays after all opaque primitives have been processed, which can be indicated by data within a geometry stream being rasterized. Where there is a limitation that opaque and non-opaque geometry be submitted separately (generally with opaque geometry first), then this switch off can be implemented. In other implementations, this relative separation of opaque and non-opaque geometry may be left up to the programmer, application or artist. In such circumstances, a flag or other condition can be set to indicate whether such convention has been observed in a particular case.

Implementations of the disclosure also may provide a decision criteria or flag that determines whether or not to implement the culling in a particular circumstance. In particular, scenes with denser geometry will typically result in more occluded surfaces, such that more benefit would be realized from implementations of the disclosure. Where geometry is less dense, less benefit would be realized. However, an amount of computation performed in implementing the disclosure (e.g., a number of comparisons) also increases as geometry density increases, such that a computation cost to implement the disclosure would generally be less for a scene with less dense geometry. As such, a person of ordinary skill may determine whether or not to provide a capability to an application or programmer to turn ray culling according on or off for specific renderings.

FIG. 7 depicts an example of data associating ray IDs to ray definition data, a sample ID and a ray/surface index indicating a current visible surface, when the identified ray was emitted. This provides an example of data that associates ray identifiers with a particular sample and an index. FIG. 8 depicts an example of data associating rays with tile and sample identifiers (these can be a hierarchical identifier, for example)), a depth of a visible surface for the sample, when the ray was emitted, and identifiers of respective primitives that provided each visible surface. Instead of providing these identifiers directly, an identifier of a parent ray may be provided, which indicates where such data can be obtained for each ray. FIG. 10 depicts an example where ray identifiers can be associated with hashes of a combination of a primitive ID and a sample ID. Such hash can be designed to make a collision between two different combinations of inputs highly unlikely. Such hashing may consume more processor resources but would allow reduction in an amount of memory required, compared with explicitly representing primitive and sample IDs for rays, which also may reduce total memory bandwidth.

The above examples were of relational data that could be queried according to ray identifiers (of course, in appropriately designed systems, other values shown in these tables could serve as keys upon which searches can be made. Other implementations may provide different organizations for data used to identify non-current rays.

FIG. 9 shows an example where sample identifiers are associated with a current ray generation identifier. Thus, when any ray is to be processed (optionally, further processed), a sample identifier associated with that ray can be used to query such a table and a comparison can be performed on the value returned and a value associated with the ray.

FIG. 11 shows an example where primitive identifiers are associated with identifiers of all samples for which that primitive provides a visible surface. Such an arrangement may be useful where there is spatial locality between samples that all have the same primitive as a visible surface. FIG. 12 shows an example that modifies the example of FIG. 11 by associating ranges of sample identifiers with primitive identifiers. FIG. 12 may be useful in situations where samples can be processed as spans or groups. Maintaining data according to these examples also may present additional criteria on which computation may be scheduled. For example, upon identifying a set of rays that all need to be tested for intersection with a particular primitive, each of these rays can be checked for a matching sample ID or sample range.

FIG. 13 depicts an example of an identifier that provides respective numbers of bits for a tile ID, a pixel ID, a sample ID and a ray generation ID. This is an example of a hierarchical identifier. FIG. 14 depicts an example of an identifier that provides a pixel ID, a sample ID and a ray generation ID. Other examples may merge the pixel and sample identifier bits. More or fewer bits may be allocated to the generation identifier. Such a generation identifier may be used when an implicit ordering of geometry can be relied upon. For example, if pre-sorting of geometry can be relied on, such that geometry (e.g., opaque geometry) is monotonically becoming closer or farther, then a generation of primary ray emitted for a given sample/surface combination can be used to determine whether a prior generation of primary ray can be culled for that sample.

In these disclosures, ray culling was described. However, as also described, culling includes checking whether a given result of a rendering operation is to be contributed to a given sample buffer. It also is to be understood that implementations include determining when a given shading result, if stored, can be committed to a final render buffer, or used in a final blend, or allowed to be overwritten. In sum, implementations may implement concurrent rasterization and ray tracing operations, and avoid unnecessary computation by determining when rays can be culled, and also maintain a desired rendering result by verifying that only rendering results for valid rays are used in a final render output.

FIG. 15 depicts an example of a hardware architecture 550 in which aspects of the disclosure can be implemented. FIG. 15 depicts that an array of computation clusters 600 provides a programmable set of computation elements that can be configured to perform computations such as geometry and pixel shading. Array 600 comprises a set of cores 602-605, each with respective local memories 76-79. Shared texture pipelines 609-610 can be used by cores 602-606. A tiling memory 661 may be provided within a chip 662. Such tiling memory may be used for holding display lists produced during a tiling of geometry, and memory 151 of FIG. 2A may be implemented using tiling memory 661. A portion of the data depicted as being stored in memory 151 may be stored in tiling memory 661, while a remainder of such data may be stored off chip, or in other memories on chip (memory 151 may be implemented as any combination of cache, on chip memory and off-chip memory). Additionally, caches may be supplied on chip 662, which can cache subsets of the data depicted in memory 151. Texture pipelines 609-610 can operate to perform texture sampling, filtering, and other processes specific to texturing. Some applications may use texture pipelines 609-610 for more general filtering and blending or other more general purpose compute applications. A memory hierarchy 615 may comprise various levels of caching and mass data storage for use by array 600. A packet unit 625 may comprise a ready stack 626, a collection definition memory 627, an empty stack 628 and a packer 629. Packet unit 625 may operate to collect specific instances of computation against different scheduling keys and form collections of such instances grouped according to scheduling key. Collections that are ready for further processing can be indicated by data on ready stack 626, while slots that are ready to be filled by new collections may be identified on empty stack 628. Packer 629 receives results of computations performed in array 600 and appends appropriate data to collections determined according to the received results. Elements of provides A set of data masters, including vertex 570, pixel 572, compute 574 and ray 576, determine workloads to be performed on array of clusters 600. A coarse scheduler 580 can determine a rough division of computation scheduling on array 600. A host interface 560 may be provided to connect to another computation unit, not depicted. A bus 566, which can be implemented as a switch fabric or other appropriate data distribution mechanism, sized and arranged according to the throughput and connectivity requirements of a particular implementation may be provided.

Figure 16:
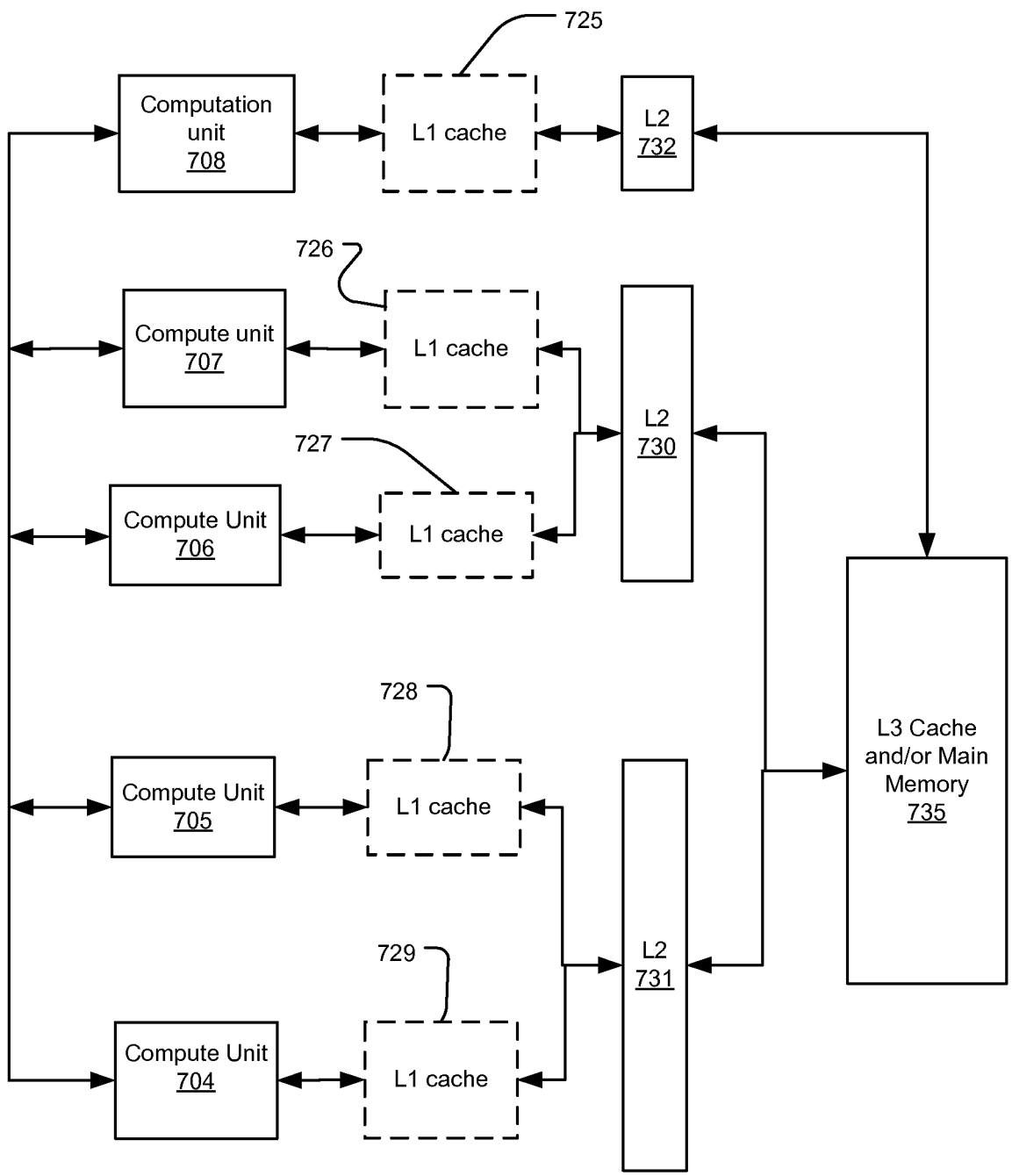

FIG. 16 depicts another example of a hardware architecture in which aspects of the disclosure can be implemented. FIG. 16 exemplifies a generally-programmable computation architecture, in which compute units 704-709 each may communicate with respective L1 caches, which in turn communicate with L2 caches, and with an L3 cache/main memory hierarchy.

For clarity in description, data for a certain type of object, e.g., a primitive (e.g., coordinates for three vertices of a triangle) often is described simply as the object itself, rather than referring to the data for the object. For example, if referring to "fetching a primitive", it is to be understood that data representative of that primitive is being fetched.

Representing realistic and finely detailed objects in the 3-D scene is usually done by providing a large number of planar geometric primitives that approximate a surface of the object (i.e., a wire frame model). As such, a more intricate object may need to be represented with more primitives and smaller primitives than a simpler object. Although providing a benefit of higher resolution, performing intersection tests between rays and larger numbers of primitives (as described above, and as will be described further below) is computationally intensive, especially since a complex scene may have many objects. Also, storage requirements increase as the number of primitives used to represent an object increases.

Modern graphics processors, processors, and other complex integrated circuitry regularly require a billion transistors (with very complex processors easily in excess of two billion transistors to be implemented, while graphics processing units may have in excess of five billion transistors). Such transistor counts are likely to increase. Graphics and generally programmable processors have used these increased transistors counts for similar and for different purposes, such as to implement increased parallelism, wider instruction issue, increased complexity of operation scheduling and reordering, prediction, larger memories (including more and bigger caches) and so on. As such, it becomes necessary to be able to describe or discuss technical subject matter concerning complex integrated circuitry and systems, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing or naming these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit. As such, a particularly named functional unit connotes structure to a person of ordinary skill, even though modified in some specified fashion.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented. In some situations, circuitry and functional modules may be described partially in functional terms, and partially in structural terms. In some situations, the structural portion of such a description may be described in terms of a configuration applied to circuitry or to functional modules, or both.

For example, describing a unit that is capable of testing rays for intersection connotes a wide variety of structures to a person of ordinary skill, in that there are a variety of known approaches to accomplish that function. Similarly, a tiling engine and macrotiling engine connote a range of structures for performing tiling and macrotiling respectively, even though those prior implementations may be modified in some capacity to implement the disclosure. A particular approach or implementation selected for such function(s) can depend on a variety of considerations. Similarly, describing data that is communicated from one unit to another connotes a range of structural interconnects implementations that can be provided for such data communication.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language"). Therefore, those of ordinary skill in the art comprehend that describing functional characteristics of a circuit, group of circuits, or even an entire device also can sufficiently describe structure of such elements.

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of an integrated circuit or system on chip in terms of its functionality conveys structure to a person of ordinary skill in the art. In the context of this disclosure, the terms "unit" and "engine" refer, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. However, such structure also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis to the contrary, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of each of the processes described herein includes machine executable code used to configure a machine to perform such process implementation. Other means for realizing implementations of the disclosed processes includes using special purpose or limited-programmability hardware to realize portions of the processes, while allocating overall control and management and a decision when to invoke such hardware to software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A machine-implemented method for rendering geometry of a 3-D scene using a rendering space which is sub-divided into a plurality of tiles, the method comprising:
    processing geometry of the 3-D scene using rasterisation operations to produce a depth range for a tile of the rendering space in which at least one currently visible element of geometry is located;
    processing at least one ray within the 3-D scene using ray tracing operations, the at least one ray associated with a sample in the tile and a depth of said at least one currently visible element of geometry for said sample;
    updating the depth range for the tile based on results of the rasterisation operations; and
    comparing, for the at least one ray, the associated depth of that ray with the depth range of the tile in which the sample associated with the ray is located and, if the associated depth of the ray is outside of the depth range for the tile, discarding results of the ray tracing operations for the ray.

2. The machine-implemented method of claim 1, wherein discarding results of the ray tracing operations for the ray comprises allowing said results to be overwritten in memory.

3. The machine-implemented method of claim 1, wherein discarding results of the ray tracing operations for the ray comprises producing a rendering result for the 3-D scene without using said results of the ray tracing operations for the ray.

4. The machine-implemented method of claim 1, wherein processing geometry of the 3-D scene using rasterisation operations to produce the depth range for the tile comprises determining the at least one currently visible element of geometry in the scene by processing at least one first element of geometry in the 3-D scene.

5. The machine-implemented method of claim 4, wherein updating the depth range for the tile based on results of the rasterisation operations comprises processing at least one second element of geometry in the 3-D scene and updating the depth range for the tile based on the at least one second element of geometry.

6. The machine-implemented method of claim 1, wherein the at least one currently visible element of geometry is an element of geometry that is not hidden by a previously processed element of geometry.

7. The machine-implemented method of claim 1, wherein processing the at least one ray within the 3-D scene using ray tracing operations comprises initiating running of a shader for the at least one currently visible element of geometry to emit the at least one ray to be traced within the 3-D scene.

8. The machine-implemented method of claim 1, comprising discarding results of the ray tracing operations for the ray prior to completion of the processing of the ray using ray-tracing operations.

9. The machine-implemented method of claim 1, wherein, when a plurality of rays contribute to the sample in the tile, the depth range for the tile is compared with the associated depths of more than one ray in the plurality of rays.

10. The machine-implemented method of claim 9, wherein comparing the depth range for the tile with the associated depths of more than one ray in the plurality of rays comprises comparing a range of intersection distances for the plurality of rays with the depth range for the tile.

11. The machine-implemented method of claim 1, wherein, if the associated depth of the ray is inside of the depth range for the tile, the depth associated with the ray is compared with a depth value associated with the sample and, if the depth associated with the sample is closer than the depth associated with the ray, discarding results of the ray tracing operations for the ray.

12. The machine-implemented method of claim 1, wherein, if the associated depth of the ray is inside of the depth range for the tile, the depth associated with the ray is compared with a depth value associated with the sample and, if the depth value associated with the sample is not closer than the depth associated with the ray, producing a rendering result for the 3-D scene using the results of the ray tracing operations for the ray.

13. The machine implemented method of claim 1, comprising concurrently performing said rasterisation and ray tracing operations.

14. An apparatus for rendering geometry of a 3-D scene using a rendering space which is sub-divided into a plurality of tiles, the apparatus comprising:
   a rasterisation engine configured to process geometry of the 3-D scene using rasterisation operations to produce a depth range for a tile of the rendering space in which at least one currently visible element of geometry is located; and
   a ray tracing engine configured to process at least one ray within the 3-D scene using ray tracing operations, the at least one ray associated with a sample in the tile and a depth of said at least one currently visible element of geometry for said sample,
   wherein the rasterisation engine is configured to update the depth range for the tile based on results of the rasterisation operations, and
   wherein the apparatus is configured to compare, for the at least one ray, the associated depth of the ray with the depth range of the tile in which the sample associated with the ray is located and, if the associated depth of the ray is outside of the depth range for the tile, discard results of the ray tracing operations for the ray.

15. The apparatus of claim 14, wherein the rasterisation engine is configured to determine the at least one currently visible element of geometry in the scene by performing hidden surface removal.

16. A machine-implemented method for rendering geometry of a 3-D scene, the method comprising concurrently:
   processing geometry of the 3-D scene using rasterisation operations to determine, for each of a plurality of sample positions, an element of geometry which is: (i) present at that sample position, and (ii) not hidden at that sample position by a previously processed element of geometry;
   processing rays in the 3-D scene using ray tracing operations, wherein each ray is associated with a sample position of the plurality of sample positions, and wherein each ray is associated with status data;
   updating the status data for rays based on results of the rasterisation operations; and
   selecting a particular ray, and using the updated status data for the particular ray to determine whether the particular ray is still current, and, if not, discarding results of the ray tracing operations for the particular ray.

17. The machine-implemented method of claim 16, wherein discarding results of the ray tracing operations for the particular ray comprises allowing said results to be overwritten in memory.

18. The machine-implemented method of claim 16, wherein discarding results of the ray tracing operations for the particular ray comprises producing a rendering result for the 3-D scene without using said results of the ray tracing operations for the particular ray.

19. The machine-implemented method of claim 16, discarding results of the ray tracing operations for the particular ray prior to completion of the processing of the particular ray using ray-tracing operations.

20. The machine-implemented method of claim 16, wherein the status data for a ray is updated to be non-current if the rasterisation operations determine that a new element of geometry is (i) present at the sample position associated with the ray, and (ii) not hidden at that sample position by a previously processed element of geometry.

* * * * *